Feb. 23, 1932.  R. W. REGENSBURGER ET AL  1,846,754
MEANS FOR SEPARATING THE WHITES FROM THE YOLKS OF EGGS
Filed Oct. 25, 1930  2 Sheets-Sheet 1
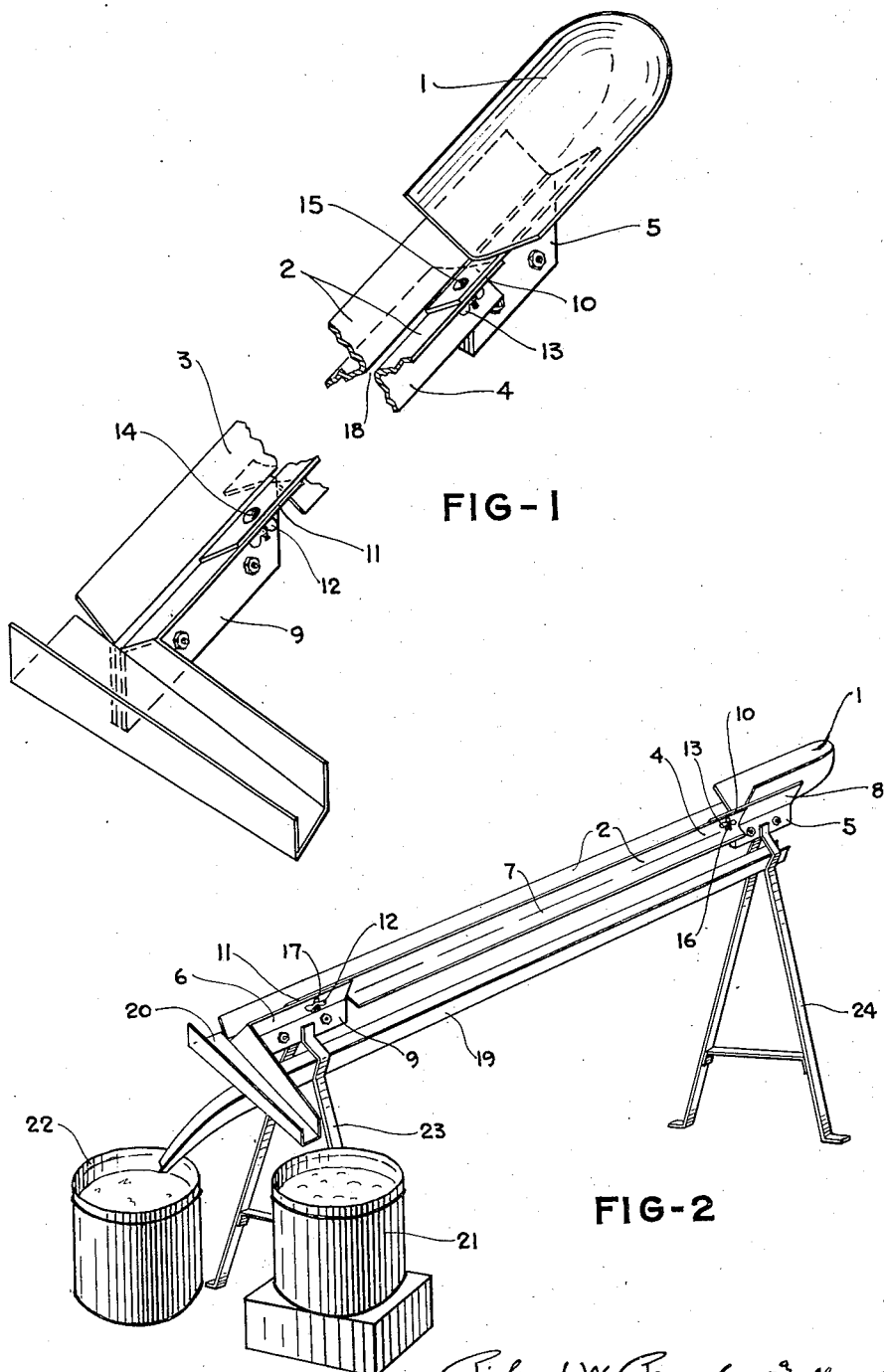

Feb. 23, 1932.      R. W. REGENSBURGER ET AL      1,846,754
MEANS FOR SEPARATING THE WHITES FROM THE YOLKS OF EGGS
Filed Oct. 25, 1930      2 Sheets-Sheet 2

INVENTOR
BY
ATTORNEY

WITNESS-

Patented Feb. 23, 1932

1,846,754

UNITED STATES PATENT OFFICE

RICHARD W. REGENSBURGER AND CHARLES T. WALTER, OF CHICAGO, ILLINOIS, ASSIGNORS, BY MESNE ASSIGNMENTS, TO INDUSTRIAL PATENTS CORPORATION, OF CHICAGO, ILLINOIS, A CORPORATION OF DELAWARE

MEANS FOR SEPARATING THE WHITES FROM THE YOLKS OF EGGS

Application filed October 25, 1930. Serial No. 491,132.

One of the objects of our invention is to provide a novel, simple, efficient and adjustable machine for separating the whites from the yolks of eggs. Another of the objects of our invention is to provide a method for so doing. With these objects in view, the invention consists in the novel construction, combination and arrangement of parts hereinafter described and claimed, and in the novel method of using said machine. In the accompanying drawings, illustrating said device, which drawings form a part of this specification, similar numerals of reference refer to similar parts in the several figures.

Figure 1 is a detail in perspective of the receiving and discharging ends of the slotted slide into which the eggs are placed after removal from the shell, showing the concealed parts in dotted lines.

Figure 2 is a perspective view of the device in position for use.

Figure 3:
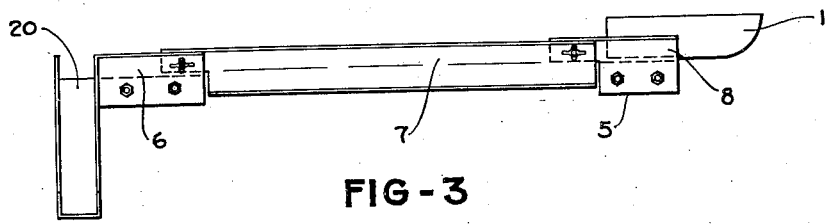
Figure 3 is a side view of the slide, the ends of which are detailed in Figure 1.
Figure 4:
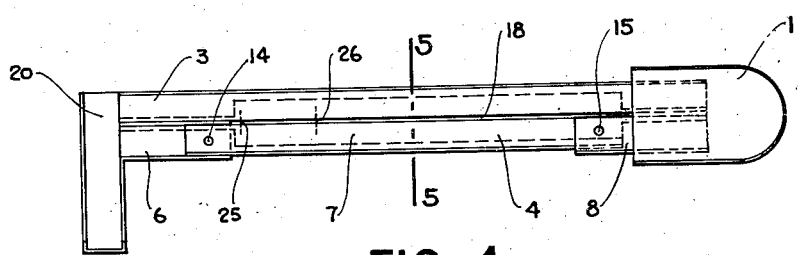
Figure 4 is a plan view of the slide shown in Figure 3.
Figure 5:
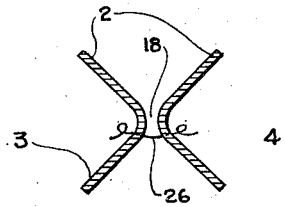
Figure 5 is a section through 5—5 of Figure 4.
Figure 6:
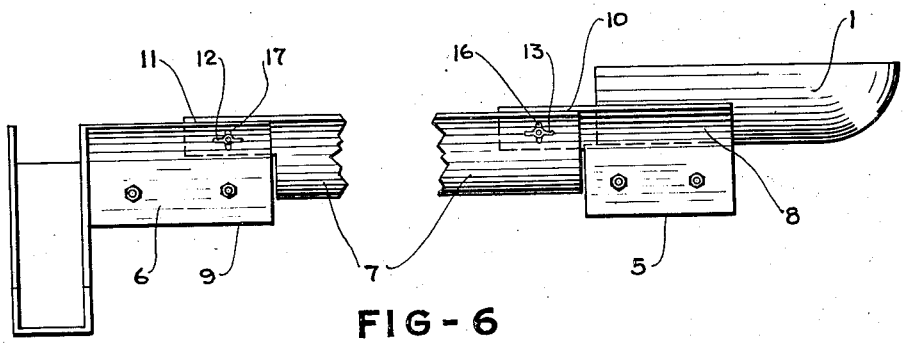
Figure 6 is a side view of Figure 1.

Referring now to Figure 2: The egg after removal from the shell is placed in the receiver 1, from which it passes by gravity to the slotted slide 2, which is formed from angle irons 3 and 4. Receiver 1 is mounted upon the slide 2 at the upper end, the lower wings of angle irons 3 and 4 being joined together for purposes of greater strength as 5. It is to be noted that angle iron 4 is comprised of three members, 6, 7 and 8, being joined to angle iron 3 to support the receiver 1; 6 being joined to angle iron 3 as at 9; 7 being lapped under the top wing of 5 at 10 and over the top wing of 9 at 11; as detailed in Figure 1; the union being effected by wing nuts 12 and 13 in combination with bolts 14 and 15, as shown in Figure 1. The bolt 15 passes through a hole of appropriate size in the upper wing of member 5 at the point indicated and through a slot 16 in member 7, as detailed in Figure 6. A hole in member 7 accommodates bolt 14 at the point indicated, which bolt 14 passes through slot 17 in member 6. By loosening wing nuts 12 and 13 member 7 may be moved up or down through the lengths of the slots 16 and 17, which increases or decreases the width of slot 18, which is clearly shown in Figure 1 and Figure 4. Eggs deposited in receiver 1 after removal from the shell pass down over the slide 2, permitting the white to fall away from the yolk and through slot 18 to trough 19. The yolk meat encased in a natural membrane slides down the slide 2 into discharge spout 20, thence into receptacle 21, the whites falling below to trough 19 pass down to receptacle 22. In Figure 2 we have shown the device supported by supports 23 and 24. Other means of support may be used as desired.

It must be borne in mind that the strength of the yolk membrane varies with the type of egg, season of the year and other conditions. It is well known that when an egg is removed from the shell and permitted to slide down an inclined slide, provided with a slot or other opening, the egg white, being fluid, will fall through the slot, and the yolk, being encased in the membrane referred to, will maintain a globular shape and will maintain itself above the slot, the width of which has been adjusted according to the consistency of the yoke meat and the strength of the membrane. However, a slot of too great length tends to rupture the membrane of the yolk by reason of prolonged subjection to the effect of the friction of the membrane against the slide, whereas a slot of too great width will likewise be conducive to breaking the membrane by creating an unsupported area unable to withstand the weight imposed upon it.

We have successfully carried out our invention in practice, by providing a trough as shown in the accompanying drawings and hereinbefore described with the slot in the base of the upper trough as shown. The trough is about 36 inches long and is inclined at an angle of about 30 degrees to the horizontal, the slot for average lots of eggs being about $\frac{1}{32}$ of an inch in width and continued from a point about 4 inches below the top of the slide to 6 inches from the bottom. To assist in drawing the whites away from the yolks we have at times, in practice, placed two fine stripping or entangling wires 25 and 26 across the opening of the slot low enough for the yolk to pass over them, one wire 25 being located about 3/4 inch below the lower termination of the slot and the other wire 26 about 6 inches above the first. The function of these wires is to assist in the separation of the white from the yolk by entangling and drawing away the white from the yolk.

It has been found that the whites of eggs is an ideal lubricant for the surface of the slide in minimizing friction between the yolk and the slide. In practice, we thoroughly coat the surfaces of the slotted trough before starting operations or before resuming operations after a period of non-use. The white of egg on the surface of the slotted trough will dry if allowed to stand without operation and this surface will subject the yolk membrane to stress.

Although this invention is specifically exemplified, it is to be understood that many of the details set forth may be modified or omitted without departing from the spirit of the invention as defined in the following claims.

We claim:

1. In a device for separating the whites from yolks of eggs, a supporting means, an inclined trough mounted on the supporting means, including a one piece angle bar and a three piece angle bar consisting of a relatively long intermediate section and relatively short end sections connected together in alignment and spaced slightly from the one piece angle bar to provide a narrow slot for the discharge of the whites of the eggs therethrough as the yolks gravitate down the trough, means for connecting said first mentioned angle bar to the end sections of the three piece angle bar, the said short sections each having an aperture and the longer section having a transverse slot at each end coinciding with the respective apertures in the shorter sections, screw threaded bolts passing through the respective coinciding apertures and slots, nuts on the bolts, whereby to provide for an adjustment of the width of said slot, an egg receiver at the upper end of the trough opening into the latter, an inclined discharge spout at the lower end of the trough, and a second inclined trough arranged under the slotted trough to receive the whites of the eggs from the first mentioned trough through the aforesaid slot, the second mentioned trough having its lower end open to permit of a free discharge of the separated whites therefrom.

2. In a device for separating the whites from yolks of eggs, a supporting means, an inclined trough mounted on the supporting means, including a one piece angle bar and a three piece angle bar consisting of a relatively long intermediate section and relatively short end sections connected together in alignment and spaced slightly from the one piece angle bar to provide a narrow slot for the discharge of the whites of the eggs therethrough as the yolks gravitate down the trough, means for connecting said first mentioned angle bar to the end sections of the three piece angle bar, the said short sections each having an aperture and the longer section having a transverse slot at each end coinciding with the respective apertures in the shorter sections, screw threaded bolts passing through the respective coinciding apertures and slots, nuts on the bolts, whereby to provide for an adjustment of the width of said slot, an egg receiver at the upper end of the trough opening into the latter, an inclined discharge spout at the lower end of the trough, a second inclined trough arranged under the slotted trough to receive the whites of the eggs from the first mentioned trough through the aforesaid slot, the second mentioned trough having its lower end open to permit of a free discharge of the separated whites therefrom, and means between the two troughs engageable by the whites passing through the slot of the slotted trough to assist in freeing the whites from the yolks.

Signed at Chicago, Illinois, this 20th day of October, A. D. 1930.

RICHARD W. REGENSBURGER.
CHARLES T. WALTER.